(12) United States Patent
Shallow et al.

(10) Patent No.: US 9,237,109 B2
(45) Date of Patent: Jan. 12, 2016

(54) SYSTEM AND METHOD FOR EFFICIENT UPSTREAM TRANSMISSION USING SUPPRESSION

(71) Applicants: STMicroelectronics, Inc., Coppell, TX (US); Cisco Technology, Inc., San Jose, CA (US)

(72) Inventors: Gale L. Shallow, Johns Creek, GA (US); Benjamin Nelson Darby, Huntsville, AL (US); Jonathan Evans, Dunwoody, GA (US); Maynard Darvel Hammond, Lawrenceville, GA (US); Zhifang J. Ni, Plano, TX (US); Charaf Hanna, Lewisville, TX (US)

(73) Assignees: STMICROELECTRONICS, INC., Coppell, TX (US); CISCO TECHNOLOGY, INC., San Jose, CA (US)

( * ) Notice: Subject to any disclaimer, the term of this patent is extended or adjusted under 35 U.S.C. 154(b) by 285 days.

(21) Appl. No.: 14/025,607

(22) Filed: Sep. 12, 2013

(65) Prior Publication Data
US 2015/0071300 A1 Mar. 12, 2015

Related U.S. Application Data

(60) Provisional application No. 61/874,951, filed on Sep. 6, 2013.

(51) Int. Cl.
*H04L 12/28* (2006.01)
*H04L 12/823* (2013.01)
*H04L 12/801* (2013.01)
*H04N 21/61* (2011.01)
*H04L 12/743* (2013.01)

(52) U.S. Cl.
CPC ............ *H04L 47/323* (2013.01); *H04L 47/193* (2013.01); *H04N 21/6118* (2013.01); *H04L 45/7453* (2013.01); *H04N 21/61* (2013.01)

(58) Field of Classification Search
CPC . H04L 47/323; H04L 47/193; H04L 45/7453; H04N 21/61
See application file for complete search history.

(56) References Cited

U.S. PATENT DOCUMENTS

| 5,191,656 | A | * | 3/1993 | Forde et al. | ............... | 710/107 |
| RE36,469 | E | * | 12/1999 | Wood et al. | ............... | 257/685 |
| 8,423,529 | B1 | * | 4/2013 | Bloomstein et al. | ...... | 707/706 |

(Continued)

OTHER PUBLICATIONS

Krapp, "DOCSIS Per Sub Throughput Optimization," CED Magazine, Dec. 31, 2006, pp. 1-10.

*Primary Examiner* — Robert Wilson
(74) *Attorney, Agent, or Firm* — Allen, Dyer, Doppelt, Milbrath & Gilchrist, P.A.

(57) ABSTRACT

A system and method suited for improved overall data transmission having a hardware-based transceiver configured for transmitting upstream data with suppressed data packets. In TCP sessions between devices, a server seeks an "acknowledgement" that the downstream data transmission has been received by a client. Some data packets sent upstream may contain only TCP acknowledgement data and therefore may be combined with other purely TCP acknowledgement data packets in order to reduce the impact of the TCP acknowledgement packets on the overall upstream data throughput. In addition, this results in increased TCP performance in the downstream transmission direction as well because the algorithm enables replacing earlier arriving ACK packets with later arriving ACK packets which allows the device to send all TCP ACK information known to the suppressor at the earliest possible time.

30 Claims, 3 Drawing Sheets

(56) References Cited

U.S. PATENT DOCUMENTS

2005/0226239 A1* 10/2005 Nishida et al. ............... 370/389
2009/0190604 A1* 7/2009 Pullen .......................... 370/412
2012/0163167 A1* 6/2012 Dade ............................ 370/229
2013/0243220 A1* 9/2013 Watanabe ..................... 381/97
2015/0071283 A1 3/2015 Hammond et al.
2015/0071302 A1 3/2015 Hanna et al.

* cited by examiner

US 9,237,109 B2

SYSTEM AND METHOD FOR EFFICIENT UPSTREAM TRANSMISSION USING SUPPRESSION

PRIORITY CLAIM

The present application claims the benefit of U.S. Provisional Patent Application Ser. No. 61/874,951, filed Sep. 6, 2013, which application is incorporated herein by reference in its entirety.

RELATED APPLICATION DATA

This application is related to the U.S. patent application Ser. No. 14/025,749 entitled HARDWARE IMPLEMENTED ETHERNET MULTIPLE TUPLE FILTER SYSTEM AND METHOD, filed Sep. 12, 2013, and application Ser. No. 14/025,584 entitled SYSTEM AND METHOD FOR IMPROVED UPSTREAM TRANSMISSION, filed Sep. 12, 2013 and which are incorporated herein by reference in their entireties.

BACKGROUND

Data Over Cable Service Interface Specification (DOCSIS) is an international telecommunications standard that details various aspects of providing and handling high-speed data transfer using cable TV (CATV) systems that employ coaxial cabling as a medium of transmission. DOCSIS is followed by many cable television operators to provide Internet access over existing proprietary cable system infrastructure. Further, the DOCSIS standard allows for many variations within systems for accomplishing data communications so long as the standard is met. As a result, many devices may employ vastly different mechanisms and algorithms for accomplishing data communication all within the standards of DOCSIS.

A typical system architecture includes two primary components: a cable modem (CM) located at a local location (e.g., a consumer home), and a cable modem termination system (CMTS) located at a central location (e.g., a company's head end facility). A typical CMTS device hosts downstream and upstream ports such that data communication from the CMTS to the CM (downstream) and data communication from the CM to the CMTS (upstream) may be facilitated by the CMTS. Since downstream communication (e.g., delivery of cable content and the like) is typically the more prevalent form of data communications between the CMTS and CM, more transmission resources are dedicated to downstream communications. This results in upstream communication being more bandwidth limited due to its less prevalent nature. As a result, upstream communications tend to have less bandwidth allocated when compared to downstream communications. This is exacerbated by systems that share the same coaxial cable for both upstream and downstream communications. Thus, bandwidth allocated for upstream communications becomes bandwidth limited and therefore efficiency of upstream data communication becomes a laudable goal of any DOCSIS system.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
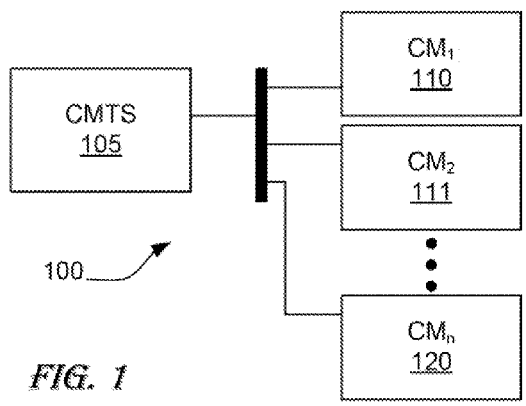
FIG. 1 is a block diagram of a cable communication system according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for improving upstream and downstream data communication between a local cable modem (or other networked device) and a central head end device. As is typical, in systems with such an arrangement, upstream communications to the head end device are controlled by the head end device by granting permission to various cable modems to transmit in response to requests to transmit from the various local cable modem devices. Further, the head end device typically only allocates a specific amount of time/bandwidth in response to each upstream data request. Therefore, it becomes more efficient to ensure that the device needing to transmit upstream transmits as much useful data during each of its allotted time frames.

According to an embodiment disclosed herein, a cable modem suited for improved overall data transmission includes a transceiver configured for transmitting data upstream once permission is granted. In between times when permission to transmit is granted, however, the cable modem is configured to prepare as much data as possible for immediate upstream transmission once that very permission is granted. Thus, prior to permission being granted, the cable modem assembles (pre-processes) the data into transmit data frames such that the data frames containing data packets may be stored in a memory coupled to the transceiver in a "ready-to-go" format in a transmit queue.

During the course of operation, the cable modems continues to receive data in a downstream communication from the head end. These data streams may include data transported using the TCP protocol as commonly defined with the TCP/IP standard. The TCP protocol seeks an "acknowledgement" that the downstream data transmission has been received by a client device which is served through the cable modem at the customer premises. The TCP/IP standard calls for sending acknowledgements back to the head end during upstream data transmission which is then forwarded back to the server to indicate that the client at the customer premises received the data. The continuous need for sending acknowledgement packets back through the head end necessarily consumes bandwidth during upstream data transmission times. Further, if the server needs to wait for acknowledgments due to limited upstream bandwidth before sending additional downstream data, the overall downstream data rate may suffer.

The upstream and downstream data communication may, subsequently, be improved by identifying and manipulating redundant acknowledgment data being sent upstream such that some of the acknowledgement data is combined into a single more-encompassing acknowledgement data packet. Thus, as data frames are being assembled in a transmit queue in the afore-mentioned ready-to-go format, at least some data packets that include acknowledgement data may be identified and replaced in the transmit queue with a newer acknowledgement data packet that includes acknowledgement information for redundant (and now replaced) acknowledgment packets.

In order to accomplish the parsing and identifying of the proper data packets, the cable modem may include a controller for controlling the transceiver and configured to pass all data to be transmitted through a suppression logic circuit. The circuit may include a hashing module for quickly identifying appropriate information within each data packet. By comparing a hash value of each data packet to a hash table of previously stored hash values from previously hashed data packets in the transmit queue, the suppression logic circuit may then easily identify data packets that may be replaced (e.g., suppressed). By reducing the overall number of pure acknowledgment packets and acknowledging transmitted data earlier, both upstream and downstream data rates may be improved. The various aspects of this overview of an embodiment are detailed further below with respect to FIGS. 1-4.

FIG. 1 is a block diagram of a cable communication system 100 according to an embodiment of the subject matter disclosed herein. In this system, a CMTS 105 may be located at a cable company facility (often referred to as the head end). Such a CMTS 105 is used to establish downstream and upstream data communication to and from various CMs located at various customer residences and the like. Thus, in FIG. 1, one CMTS 105 may be dedicated to serve n customers, each having one CM ($CM_1$, $CM_2$, . . . $CM_n$) located at the customer residence. In some embodiments, a single customer may have more than one CM, but the ownership status of the CMs are not relevant to the systems described herein.

As such, content, such as television channel transmissions, pay-per-view transmissions and the like may be delivered to the various CMs ($CM_1$, $CM_2$, . . . $CM_n$) in downstream communications and requests for content and delivery of content back to the CMTS 105 may be delivered to the CMTS 105 from one or more CMs ($CM_1$, $CM_2$, . . . $CM_n$) in upstream communications.

Typically, the relationship of one CMTS to many coupled CMs means that resources at the CMTS are weighted toward providing data to the CMs in a data flow direction referred to as downstream transmission. That is, the majority of the data being communicated between the CMTS and any CM involves the delivery of content to the CM at the residential customer site, e.g., downstream transmissions. When any CM, however, needs to transmit data to the CMTS (for example, requesting content delivery or upload to content to a server location), the CM may typically need to request transmission permission from the CMTS for upstream transmission. Because a majority of the bandwidth allotted to the communication link is weighted toward downstream transmission, upstream transmission bandwidth is limited. Such limitations are manifested in limited and sparse timeframes granted by the CMTS for upstream transmission from a single CM at a time. Therefore, to be efficient and take advantage of the limited timeframe (i.e., limited bandwidth) available for upstream transmission, a method referred to as direct burst processing may be implemented to improve the efficiency of upstream transmission.

As is discussed in further detail below, a direct bursting processing mechanism may be implemented whereby prior to transmission time, upstream data is pre-processed to build appropriate data frames such that the data frames are then contiguously stored in a memory in a ready-to-go format. Then, when upstream transmission permission is granted, a burst is generated by pointing to a start address in the memory and a length associated with the block of data frames that are ready in the store memory. Multiple frames and possible fragments can hence be transmitted in one burst at a very high rate given that there is no need for any on-the-fly per packet scanning/processing.

Figure 2:
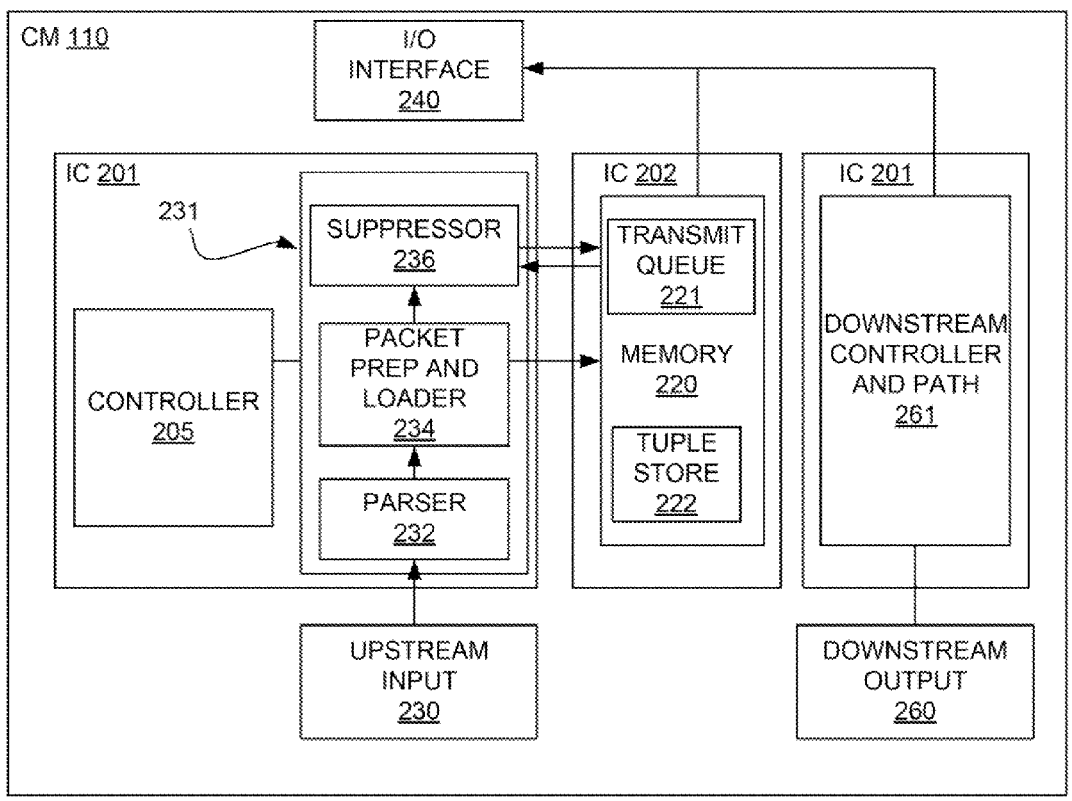
FIG. 2 is a block diagram of a device having a transmission suppression circuit for improving overall data transmission according to an embodiment of the subject matter disclosed herein.

FIG. 2 is a block diagram of a device 110 having a transmission suppression circuit for improving overall data transmission according to an embodiment of the subject matter disclosed herein. The device may typically be a cable modem 110 or set top box as shown within the system of FIG. 1. In other embodiments, the device 110 may be any manner of computing device including a personal computer or server computer. In this embodiment, one or more integrated circuits 201 and 202 may be used to implement the various electronic functionalities as described herein. Each integrated circuit 201 and 202 may be disposed on individual dies or may be disposed on the same circuit die. Further, each integrated circuit 201 and 202 may include electronic circuits disposed therein including processors, memory, input/output functionality and the like.

In FIG. 2, one integrated circuit 201 may be an upstream/downstream transceiver ("transceiver" hereinafter) configured to facilitate both upstream data communication and downstream data communication between the CM 110 (e.g., the device itself) and a head end CMTS (not shown in FIG. 2). In FIG. 2, the IC 201 is shown as two parts, one on the left side including the upstream path and one on the right side including the downstream path. A skilled artisan understands that these two parts as shown in the block diagram of FIG. 2 may be the same overall integrated circuit. Typically, the CM 110 may be coupled to a communication channel (e.g., a cable) or a communication network (i.e., the Internet) via an input/output interface 240. Such a coupling may enable two-way communication such that both upstream and downstream communication is accomplished on the same physical connections. The protocols under which various communications may be accomplished are defined by DOCSIS. Thus, data to be communicated upstream to the CMTS may be sent through an upstream input 230 and upstream data path 231. Similarly, data received from the CMTS may be received through a downstream data path 261 and output to other components beyond the transceiver IC 201 through a downstream output 260.

To better understand the interaction between DOCSIS and packet-switched network communications, consider the operation of the controller 205 (sometimes called a scheduler). In order to transmit data upstream, a cable modem 110 first requests, via the controller 205, time for upstream data transmission, i.e., bandwidth, from the CMTS. As discussed briefly above, the CMTS then grants the bandwidth and the cable modem 110 then waits for its scheduled time before it can transmit data during an upstream data transmission. This cycle is referred to as the request-grant cycle $T_{RGC}$. The number of transmit bursts per second that an individual cable modem 110 can send is inversely proportional to the request-grant cycle duration $T_{RGC}$. For example, if $T_{RGC}$ is 5 ms, then the maximum bursts per second the modem can send is 200 per second. As has been mentioned, at least some of the data being transmitted upstream includes acknowledgments ("TCP ACK" hereinafter) for data now received by the cable modem 110 during a previous downstream communication.

TCP data streams require regular TCP ACK transmissions from the local client device in order for the server to continue sending data to the client. Therefore, downstream data throughput is related to $T_{RGC}$ since each TCP ACK is a packet in the upstream communication burst. Hence, overall data throughput is inversely proportional to $T_{RGC}$. That is, more bursts upstream (consequently having more TCP ACK packets) equates to more bandwidth downstream.

As has been alluded to, a method for removing and replacing (commonly referred to as "suppression") at least some of the TCP ACK data packets overcomes the $T_{RGC}$ limitation without actually affecting the DOCSIS specification or involving the CMTS. It improves downstream TCP transmissions by taking advantage of $T_{RGC}$ and only sending the last TCP ACK it receives when an upstream session is granted. Thus, the number of TCP ACKs is fewer, but the number of bytes acknowledged by each TCP ACK is increased. The following paragraphs help illustrate and example acknowledgement suppression according to an embodiment.

When a cable modem determines that data is to be communicated upstream, the data itself may be prepared in a section of the cable modem not discussed herein and prepared in the form of data packets according to DOCSIS standards. These data packets are received at the transceiver 201 through an upstream input 230 and passed to an upstream data path 231.

The upstream data path includes a number of components and modules for preparing the data packets for eventual transmission upstream. Not all of the components and modules are discussed herein, but rather the components and modules directly associated with assisting the suppression methods described here. The first of these components includes a TCP/IP header parser 232.

The TCP/IP header parser 232 parses all data packets that pass through the upstream data path 231 and identifies TCP ACK packets which may be eligible for suppression. Generally, a data packet is eligible for suppression if the data packet includes only data about TCP ACK and no other data (e.g., payload). Specifically, the TCP/IP header parser 232 identifies TCP ACK packets which contain no TCP data field, no extra TCP flags, and no TCP or IP options. Packets with these attributes are considered suppressible TCP ACK packets. The TCP/IP header parser 232 captures the ACK number for the packet as well as the information needed to identify the session that the TCP ACK packet belongs to (e.g., TCP source and destination addresses, TCP source and destination ports). This information is then forwarded to the next processing stage in the data processing path along with the packet data.

With the newly identified TCP ACK data packets, the various data packets may then be sent to a packet preparation and loader module 234. This module 234 assembles data packets into data frames and loads the data frames into a memory 220 in an order for eventual data transmission. The memory may be a double data rate (DDR) random-access memory (RAM), or other type of memory, that is either disposed on the same integrated circuit die as the overall device being described herein or may be disposed on a separate second integrated circuit die. Further, the memory 220 may further include (one or more) packet queue 221 that may be used to enable storage of data frames marked for upstream transmission in the aforementioned ready-to-go format and transmission order. This transmit queue may include data packets identified as suppressible for the time being, (e.g., until additional analysis can be accomplished as described further below).

At this point, packets which have been identified as suppressible ACK packets are sent to a suppression module 236 for further analysis along with the information needed to identify the session: (TCP source and destination addresses, TCP source and destination ports, ACK number, and length). This information is referred to as the "session tuple" throughout the remainder of this disclosure. Generally, the suppression module 236 analyzes each suppressible data packet to determine if suppression and replacement are applicable. This analysis is described in greater detail below with respect to FIG. 3.

Figure 3:
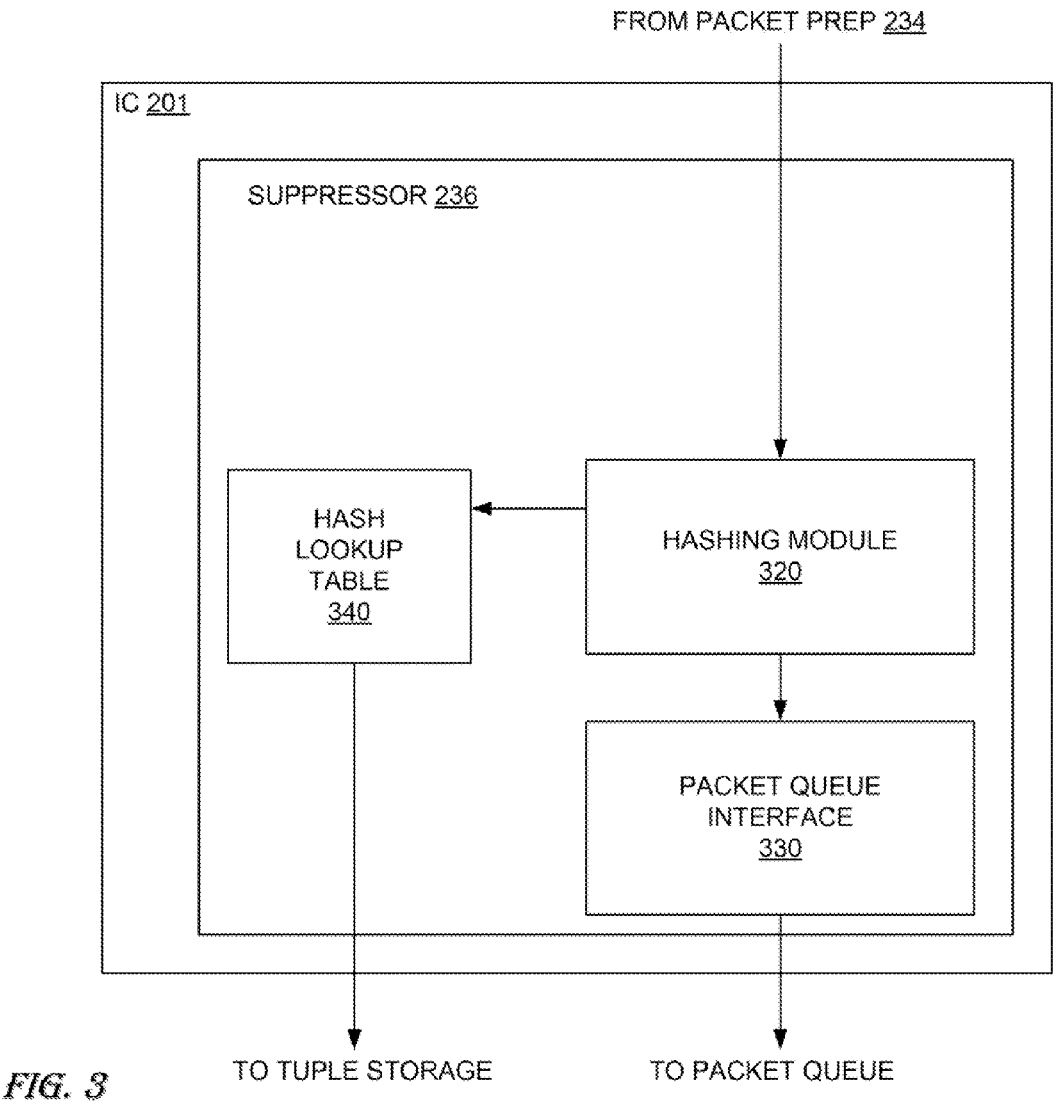
FIG. 3 is a block diagram of an integrated circuit having a transmission suppression circuit for improving overall data transmission according to an embodiment of the subject matter disclosed herein.

FIG. 3 is a block diagram of an integrated circuit 201 having a transmission suppression circuit 236 for improving overall data transmission according to an embodiment of the subject matter disclosed herein. In order to maintain a high packet throughput rate, it is desirable to maintain an on-chip means of storing information required to quickly identify and analyze suppressible ACK data packets. However, it is also desirable to minimize the silicon cost impact of this function on the transceiver IC 201. To accomplish this, the session tuple may be received by the suppressor 236 and processed by a hashing function that may be a logical block that is part of a hash module 320. In one embodiment, the hashing function processes the session tuples which yields one 32-bit word.

The 32-bit result of that hashing function may be stored in a hash lookup table 340 (located on the same chip for fast access) to be used to compare against additional suppressible TCP ACK data packets when received and hashed. The hashing function effectively compresses the larger session tuple words into a single word allowing for efficient on chip storage and fast comparisons that ensures a high packet throughput performance while minimizing storage requirements. In this manner, as new session tuples are sent to the suppressor 236, a number of determinations may be made based on the hash value and whether or not a match is determined in the hash lookup table 340 or in the tuple storage 222. In order to keep the hashing function reasonable, there exist possibilities that two different session tuples produce the same hash value. When this occurs, an additional step may be accomplished by the suppressor 236 such that hash values of session tuples that hash to the same value are analyzed further before a decision is made for adjusting the transmit queue. To insure that a truly suppressible session tuple has been identified, the suppressor may store the session tuples. The session tuples may be stored in the off-chip memory in the tuple store 222. Then, when a match is identified in the hash lookup table 340, the full session tuple may be retrieved for a full comparison against the received session tuple. This additional off-chip memory retrieval is only performed when a match occurs so the impact on system performance with respect to off-chip memory accesses is minimized. These various scenarios for determinations are described in the following paragraphs.

There are four cases to be handled when an ACK session tuple is received by the suppressor 236. In a first case, the session tuple is hashed and identifies a new session tuple that does not yet have a hash value stored in the hash lookup table. Further, the hash lookup table 340 has enough room to add a new entry and there are available packet buffers for use the transmit queue 221. In this case, when the new session tuple is hashed, there is no match for the hash output value, thereby indicating that the new session tuple may be marked for potential later suppression. The newly obtained hash value is entered into the next available location in the hash lookup table 340. Additionally, the entire session tuple used to generate the hash value (as well as packet number and packet length) are added to tuple store 222 in the memory 220.

The tuple store may comprise a 256 entry table. The session tuple stored herein may be used in a subsequent step to guard against the case that more than one session tuple set can generate the same hash output value. In this case, the session tuple may be compared directly to determine if the new session tuple matches an identical session tuple already stored in the tuple store 222.

In the second case, the session tuple is hashed and identifies a new session tuple that does not yet have a hash value stored in the hash lookup table. However, the hash lookup table 340 does not have enough room to add a new entry. Thus, there was no match for the hash output value and there are no open slots available in the hash lookup table 340. As such, the data packet associated with the session tuple is forwarded to the transmit queue 221 as if it was not a suppressible data packet.

In the third case, the session tuple is hashed and identifies a new session tuple that does not yet have a hash value stored in the hash lookup table 340. Further, the hash lookup table 340 has enough room to add a new entry but there are no available packet buffers for use in the transmit queue. Thus, there was no match for the hash output value and there are no open slots available in the transmit queue 221. As such, the data packet associated with the session tuple is dropped and an interrupt is generated to indicate that there are no available packet buffers.

Lastly, in the fourth case, the session tuple is hashed and identifies a known hash value already in the hash lookup table 340, e.g., a match. Then, the suppressor 236 accesses the tuple store 222 to read back the session tuple that was stored in conjunction with the original hash value stored in the hash lookup table 340. The suppressor 236 then compares the session tuple (IP address, port field values, and packet length of the associated packet) with the values obtained from the tuple store 222. If the TCP portion of each session tuple does not match, then the associated data packet is simply forwarded to the transmit queue as if it were not a suppressible data packet. If the TCP portions do match, additional criteria may be checked to determine if the potential suppressible data packet currently in the transmit queue 221 can be suppressed and, if so, how to manage the hash lookup table entry for this session tuple.

The additional criteria then involve checking further session tuple data. If the session tuple packet's ACK number is less than or equal to the ACK number stored in the tuple store, the associated data packet is forwarded to the transmit queue as if it were not a suppressible data packet and the hash lookup table 340 entry for this session tuple is updated to mark this newly stored session tuple as the suppressible data packet for this session. If the session tuple packet has TCP flags other than ACK (SYN, RST, FIN, URG), then, the suppressor 236 overwrites the data packet in the service flow of the transmit queue and invalidates the hash lookup table entry (in order to preserve the special flag information because an entry not in the hash lookup table will not be replaced by suppression). If the length portion of the retrieved session tuple is not matched by the packet length field stored in the tuple store, then the previously stored suppressible data packet is not suppressed and as long as there is buffer space available in the transmit queue 221, the suppressible packet is added to the transmit queue 221 and the session tuple's entry in the hash lookup table 340 is updated with the length and location of the new data packet. If none of these criteria are met, then the suppressor 236 overwrites the data packet in the transmit queue with the new data packet, thereby correctly and safely suppressing the overwritten data packet.

Data packets waiting for transmission opportunities are stored in the transmit queue 221. While a TCP ACK data packet with an active session in the hash lookup table 340 is present in the transmit queue 221, incoming suppressible data packets for that session may overwrite the previous ACK data packets in the transmit queue 221. Once the TCP ACK data packet exits the transmit queue 221 e.g., via transmission upstream, the session entry for that TCP session is invalidated.

Because session tuple entries in the hash lookup table 340 are not reserved for a particular TCP session (but are rather created and deleted on an as needed manner) there is no limit to the total number of TCP sessions that can be supported by this transceiver 201. Inactive sessions are invalidated and new active sessions added to the hash lookup table 340 as needed. In order to best handle the use of the entry slots in the hash lookup table 340, an aging mechanism may be used to determine which sessions in the hash lookup table 340 should be replaced first, i.e., sessions with the longest periods of inactivity are replaced first. In one embodiment, an 8-bit age counter may be stored along with the hash value in the hash lookup table 340. If the hash lookup table 340 is full and another unique session comes in, the least used entry (entry with the lowest count value) is evicted.

The aspects and inter-relationships of the components described with respect to FIG. 3 may be better understood with respect to the example method discussed below with respect to FIG. 4.

Figure 4:
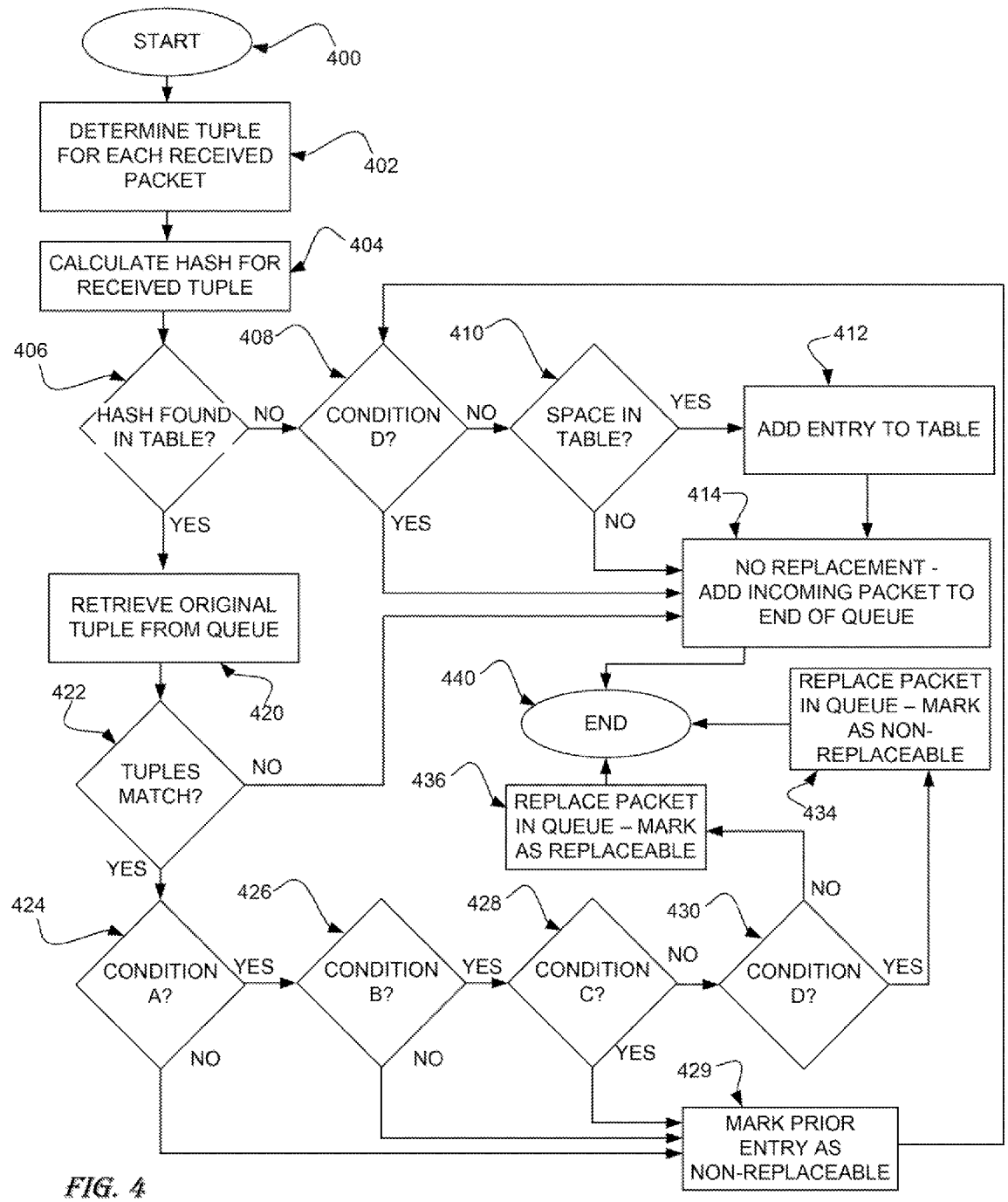
FIG. 4 is a flow chart of a method for a transmission suppression circuit for improving overall data transmission according to an embodiment of the subject matter disclosed herein.

FIG. 4 is a flow chart of a method for a transmission suppression circuit for improving overall data transmission according to an embodiment of the subject matter disclosed herein. The method may be accomplished by the systems and devices as described with respect to FIGS. 1-3.

In this embodiment, the method starts at 400 when a device, e.g., the CM 110, begins receiving data packets scheduled for upstream communication. Each data packet received may be parsed and identified as a potential suppressible data packet by generating a session tuple at step 402. As discussed above with respect to FIG. 3, there are four general cases to be handled when an ACK session tuple is received by the suppressor 236. In all four cases, the session tuple is hashed at step 404. Then, at decision step 406, the method determines if the hash value is already stored in the hash lookup table 340 or not. If the hash lookup table 340 does not have the new hash value (take the NO branch), the method then determines if "Condition D" (described next) is met at decision step 408. Condition D is the presence of an additional flag bit(s) being set in the data packet header. If additional flags are not set, then the tuple is further analyzed at the next decision step 410 as to whether there is space in the hash lookup table 340.

If there is no room in the hash lookup table 340 (NO branch), then the associated data packet is considered not suppressible and is simply added to the transmit queue at step 414. This is the second case as described above. If there is room (YES branch), then an entry is added (for future use is determining suppressible data packets) at step 412 and the data packet is still added to the transmit queue at step 414. This is the first case as described above. Note that the third case from above is not shown in this flow diagram. Further yet, back at decision step 408, if additional flag bits are set (Condition D), then the data packet is also simply added to the transmit queue (YES branch).

Turning back to decision step 406, if the hash lookup table 340 does have the new hash value (YES branch), the method then retrieves the associated stored tuple from the tuple store 222 in the memory 220 at step 420. The remainder of the flow diagram deals with the fourth condition as discussed above.

Having identified a match in the hash lookup table and subsequently retrieved the session tuple associated with the matched entry, the suppressor 236 then compares the session tuple (IP address, port field values, and packet length of the associated packet) with the values obtained from the tuple store 222 at decision step 422. If the TCP portion of each session tuple does not match (NO branch), then the associated data packet is simply forwarded to the transmit queue 221 as if it were not a suppressible data packet at step 414. If the TCP portions do match, additional criteria may be checked to determine if the potential suppressible data packet currently in the transmit queue 221 can be suppressed and, if so, how to manage the hash lookup table 340 entry for this session tuple.

The additional criteria then involve checking further session tuple data (Condition A, B, and C in decision steps 424, 426, and 428, respectively). Starting with decision step 424 and Condition A, if the session tuple packet's ACK number is less than or equal to the ACK number stored in the tuple store (NO branch), the stored data packet is marked as not suppressible at step 429 and the incoming packet is further analyzed at step 408 (analysis for Condition D again). The YES branch moves on to decision step 426 with Condition B.

At decision step 426, if the length portion of the retrieved session tuple is not matched by the packet length field stored in the tuple store (NO branch), then the stored data packet is marked as not suppressible at step 429 and the incoming packet is further analyzed at step 408. The YES branch moves on to decision step 428 with Condition C.

At decision step 428, if the data packet already stored in the transmit queue is scheduled for release (YES branch), then the stored data packet is marked as not suppressible at step 429 and the incoming packet is further analyzed at step 408. The NO branch moves on to decision step 430 with Condition D again.

As discussed above, if all of the appropriate criteria are met (e.g., conditions A-D) then the suppressor 236 overwrites the data packet in the transmit queue with the new data packet, thereby correctly and safely suppressing the overwritten data packet. Further, the suppressor 236 will mark the newly replaced data packet as further replaceable (step 436) if additional flags are not set (Condition D—NO branch) or as non-replaceable (step 434) if additional flags are set (Condition D—YES branch). All of these different paths culminate in an end step 440.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device comprising:
   a transceiver configured to receive and transmit data, and store the data in a memory;
   a suppression circuit coupled to the transceiver and configured to
      determine a characteristic value for a first data packet from the data, and store the characteristic value in the memory,
      determine respective characteristic values for subsequent data packets, and
      compare the characteristic value of the first data packet and a given characteristic value for a given subsequent data packet to identify the first data packet as being a suppressible transmission; and
   a controller coupled to the transceiver and configured to replace the suppressible transmission stored in the memory.

2. The device of claim 1, wherein the suppression circuit comprises a hardware-based logic circuit configured to parse the data to identify the suppressible transmission.

3. The device of claim 1, wherein the characteristic value comprises a hash value; and wherein the suppression circuit is configured to parse all data packets received to determine the hash value of each data packet that does not contain payload data and to store the hash value in a hash value table.

4. The device of claim 3, wherein the suppression circuit is configured to:
   determine if a given hash value for the given subsequent data packet matches a stored hash value in the hash table, then identify the given subsequent data packet as rendering a previous data packet suppressible; and
   if the given hash value does not match the stored hash value in the hash table, then identify the given subsequent data packet as not rendering any previous data packet suppressible and adding the given hash value to the hash table.

5. The device of claim 1, wherein the characteristic value comprises a tuple; wherein the suppression circuit is configured to:
   parse the first data packet to isolate a tuple of the first data packet and store the tuple in the memory if the tuple meets criteria for being suppressible;
   parse the subsequent data packets to isolate a tuple in each of the subsequent data packets;
   compare the tuple of the first data packet to each tuple in the subsequent data packets;
   when a given tuple of the given subsequent data packet matches the tuple of the first data packet stored in the memory, then the given subsequent data packet is identified as possibly rendering the first data packet suppressible; and
   when the given tuple of the given subsequent data packet does not match the tuple of the first data packet stored in the memory, then the given subsequent data packet is identified as not rendering the first data packet suppressible and storing the given tuple of the given subsequent data packet in the memory.

6. The device of claim 1, wherein the characteristic value comprises a transmission control protocol (TCP) identification data; wherein the suppression circuit is configured to:
   identify TCP identification data about the first data packet and store the TCP identification data in the memory;
   identify TCP identification data about the subsequent data packets and comparing the TCP identification data of the first data packet to the TCP identification data of each subsequent data packet;
   when given TCP identification data of the given subsequent data packet matches the TCP identification data of the first data packet, then the given subsequent data packet is identified as possibly rendering the first data packet suppressible; and
   when the given TCP identification data of the given subsequent data packet does not match the TCP identification data of the first data packet, then the given subsequent data packet is identified as not rendering the first data packet suppressible.

7. The device of claim 1, wherein the characteristic value comprises an acknowledgement (ACK) number; wherein the suppression circuit is configured to:
   identify an ACK number in the first data packet and store the ACK number in the memory; and identify ACK numbers respectively in the subsequent data packets and compare the ACK number of the first data packet to the ACK number of each subsequent data packet;

when a given ACK number of the given subsequent data packet is greater than the ACK number of the first data packet, then the given subsequent data packet is identified as possibly rendering the first data packet suppressible; and when the given ACK number of the given subsequent data packet is less than the ACK number of the first data packet, then the given subsequent data packet is identified as not rendering the first data packet suppressible.

8. The device of claim 1, wherein the suppressible transmission comprises only transmission control protocol (TCP) acknowledgment (ACK) data.

9. The device of claim 1, further comprising a data packet preparation circuit configured to arrange data received at the transceiver into data frames.

10. The device of claim 9, further comprising a data frame circuit coupled to the data packet preparation circuit and configured to load the data frames into the memory.

11. The device of claim 1, wherein the characteristic value comprises session identification data.

12. A system comprising:
a memory;
a upstream device configured to receive and transmit data, and store the data in said memory;
a suppression circuit coupled to the upstream device and configured to
determine a characteristic value for a first data packet from the data, and store the characteristic value in the memory,
determine respective characteristic values for subsequent data packets, and
compare the characteristic value of the first data packet and a given characteristic value for a given subsequent data packet to identify the first data packet as being a suppressible transmission;
a controller coupled to the upstream device and configured to replace the suppressible transmission stored in the memory; and
a downstream device configured to receive data from said upstream device.

13. The system of claim 12, wherein the suppression circuit comprises a hardware-based logic circuit configured to parse the data to identify the suppressible transmission.

14. The system of claim 12, wherein the characteristic value comprises a hash value; and wherein the suppression circuit is configured to parse all data packets received to determine the hash value of each data packet that does not contain payload data and to store the hash value in a hash value table.

15. The system of claim 14, wherein the suppression circuit is configured to:
determine if a given hash value for the given subsequent data packet matches a stored hash value in the hash table, then identify the given subsequent data packet as rendering a previous data packet suppressible; and
if the given hash value does not match the stored hash value in the hash table, then identify the given subsequent data packet as not rendering any previous data packet suppressible and adding the given hash value to the hash table.

16. The system of claim 12, wherein the characteristic value comprises a tuple; wherein the suppression circuit is configured to:

parse the first data packet to isolate a tuple of the first data packet and store the tuple in the memory if the tuple meets criteria for being suppressible;
parse the subsequent data packets to isolate a tuple in each of the subsequent data packets;
compare the tuple of the first data packet to each tuple in the subsequent data packets;
when a given tuple of the given subsequent data packet matches the tuple of the first data packet stored in the memory, then the given subsequent data packet is identified as possibly rendering the first data packet suppressible; and
when the given tuple of the given subsequent data packet does not match the tuple of the first data packet stored in the memory, then the given subsequent data packet is identified as not rendering the first data packet suppressible and storing the given tuple of the given subsequent data packet in the memory.

17. An integrated circuit (IC) comprising:
an input configured to receive and transmit data, and store the data in a memory;
a suppression circuit coupled to the input and configured to
determine a characteristic value for a first data packet from the data, and store the characteristic value in the memory,
determine respective characteristic values for subsequent data packets, and
compare the characteristic value of the first data packet and a given characteristic value for a given subsequent data packet to identify the first data packet as being a suppressible transmission; and
a controller coupled to the input and configured to replace the suppressible transmission stored in the memory.

18. The IC of claim 17, wherein the suppression circuit comprises a hardware-based logic circuit configured to parse the data to identify the suppressible transmission.

19. The IC of claim 17, wherein the characteristic value comprises a hash value; and wherein the suppression circuit is configured to parse all data packets received to determine the hash value of each data packet that does not contain payload data and to store the hash value in a hash value table.

20. The IC of claim 19, wherein the suppression circuit is configured to:
determine if a given hash value for the given subsequent data packet matches a stored hash value in the hash table, then identify the given subsequent data packet as rendering a previous data packet suppressible; and
if the given hash value does not match the stored hash value in the hash table, then identify the given subsequent data packet as not rendering any previous data packet suppressible and adding the given hash value to the hash table.

21. The IC of claim 17, wherein the characteristic value comprises a tuple; wherein the suppression circuit is configured to:
parse the first data packet to isolate a tuple of the first data packet and store the tuple in the memory if the tuple meets criteria for being suppressible;
parse the subsequent data packets to isolate a tuple in each of the subsequent data packets;
compare the tuple of the first data packet to each tuple in the subsequent data packets;
when a given tuple of the given subsequent data packet matches the tuple of the first data packet stored in the memory, then the given subsequent data packet is identified as possibly rendering the first data packet suppressible; and when the given tuple of the given subsequent data packet does not match the tuple of the first data packet stored in the memory, then the given subsequent data packet is identified as not rendering the first data packet suppressible and storing the given tuple of the given subsequent data packet in the memory.

22. A method comprising:
operating a transceiver to receive and transmit data, and store the data in a memory; and
operating a suppression circuit coupled to the transceiver and to
determine a characteristic value for a first data packet from the data, and store the characteristic value in the memory,
determine respective characteristic values for subsequent data packets,
compare the characteristic value of the first data packet and a given characteristic value for a given subsequent data packet to identify the first data packet as being a suppressible transmission, and
replace the suppressible transmission stored in the memory.

23. The method of claim 22, wherein the characteristic value comprises a hash value; and further comprising operating the suppression circuit to parse all data packets received to determine the hash value of each data packet that does not contain payload data and to store the hash value in a hash value table.

24. The method of claim 23, further comprising operating the suppression circuit to:
determine if a given hash value for the given subsequent data packet matches a stored hash value in the hash table, then identify the given subsequent data packet as rendering a previous data packet suppressible; and
if the given hash value does not match the stored hash value in the hash table, then identify the given subsequent data packet as not rendering any previous data packet suppressible and adding the given hash value to the hash table.

25. The method of claim 22, wherein the characteristic value comprises a tuple; and further comprising operating the suppression circuit to:
parse the first data packet to isolate a tuple of the first data packet and store the tuple in the memory if the tuple meets criteria for being suppressible;
parse the subsequent data packets to isolate a tuple in each of the subsequent data packets;
compare the tuple of the first data packet to each tuple in the subsequent data packets;
when a given tuple of the given subsequent data packet matches the tuple of the first data packet stored in the memory, then the given subsequent data packet is identified as possibly rendering the first data packet suppressible; and
when the given tuple of the given subsequent data packet does not match the tuple of the first data packet stored in the memory, then the given subsequent data packet is identified as not rendering the first data packet suppressible and storing the given tuple of the given subsequent data packet in the memory.

26. The method of claim 22, wherein the characteristic value comprises a transmission control protocol (TCP) identification data; and further comprising operating the suppression circuit to:
identify TCP identification data about the first data packet and store the TCP identification data in the memory;
identify TCP identification data about the subsequent data packets and comparing the TOP identification data of the first data packet to the TCP identification data of each subsequent data packet;
when given TCP identification data of the given subsequent data packet matches the TCP identification data of the first data packet, then the given subsequent data packet is identified as possibly rendering the first data packet suppressible; and
when the given TCP identification data of the given subsequent data packet does not match the TOP identification data of the first data packet, then the given subsequent data packet is identified as not rendering the first data packet suppressible.

27. The method of claim 22, wherein the characteristic value comprises an acknowledgement (ACK) number; and further comprising operating the suppression circuit to:
identify an ACK number in the first data packet and store the ACK number in the memory; and
identify ACK numbers respectively in the subsequent data packets and compare the ACK number of the first data packet to the ACK number of each subsequent data packet;
when a given ACK number of the given subsequent data packet is greater than the ACK number of the first data packet, then the given subsequent data packet is identified as possibly rendering the first data packet suppressible; and
when the given ACK number of the given subsequent data packet is less than the ACK number of the first data packet, then the given subsequent data packet is identified as not rendering the first data packet suppressible.

28. The method of claim 22, wherein the suppressible transmission comprises only transmission control protocol (TCP) acknowledgment (ACK) data.

29. The method of claim 22, further comprising operating a data packet preparation circuit to arrange data received at the transceiver into data frames.

30. The method of claim 29, further comprising operating a data frame circuit coupled to the data packet preparation circuit and to load the data frames into the memory.

* * * * *

UNITED STATES PATENT AND TRADEMARK OFFICE
CERTIFICATE OF CORRECTION

Page 1 of 1

PATENT NO.         : 9,237,109 B2
APPLICATION NO.    : 14/025607
DATED              : January 12, 2016
INVENTOR(S)        : Shallow et al.

It is certified that error appears in the above-identified patent and that said Letters Patent is hereby corrected as shown below:

IN THE CLAIMS

Column 14, Line 14,    Delete: "TOP"
Claim 26               Insert --TCP--

Column 14, Line 23,    Delete: "TOP"
Claim 26               Insert --TCP--

Signed and Sealed this
Eighth Day of March, 2016

Michelle K. Lee
*Director of the United States Patent and Trademark Office*